US006804895B2

(12) United States Patent
Shapiro

(10) Patent No.: US 6,804,895 B2
(45) Date of Patent: Oct. 19, 2004

(54) ANGLE MEASUREMENT TOOL

(76) Inventor: Marc Lev Shapiro, 1931 Martha's Rd., Alexandria, VA (US) 22307

( * ) Notice: Subject to any disclaimer, the term of this patent is extended or adjusted under 35 U.S.C. 154(b) by 0 days.

(21) Appl. No.: 10/365,784

(22) Filed: Feb. 14, 2003

(65) Prior Publication Data
US 2004/0006881 A1 Jan. 15, 2004

Related U.S. Application Data
(60) Provisional application No. 60/360,523, filed on Feb. 28, 2002.

(51) Int. Cl.⁷ .................................................. B43L 7/10
(52) U.S. Cl. ............................. 33/471; 33/495; 33/534
(58) Field of Search ................... 33/1 N, 418, 420–422, 33/424, 452, 456, 459, 465, 468, 469, 471, 472, 495–500, 534

(56) References Cited

U.S. PATENT DOCUMENTS

| | | | |
|---|---|---|---|
| 597,464 A * 1/1898 | Girton | ........................ | 33/471 |
| 832,483 A * 10/1906 | Johnson | ........................ | 33/471 |
| 840,628 A * 1/1907 | Johnson | ........................ | 33/471 |
| 1,125,770 A * 1/1915 | Turgeon | ........................ | 33/497 |
| 1,299,978 A * 4/1919 | MacDowney | ................ | 33/471 |
| 1,341,435 A * 5/1920 | Olsen | ........................ | 33/495 |
| 1,351,527 A * 8/1920 | Lopez | ........................ | 33/499 |
| 1,585,563 A * 5/1926 | Schlattau | ..................... | 33/471 |
| 1,599,776 A * 9/1926 | Lazarevich | .................. | 33/468 |
| 1,690,832 A * 11/1928 | Owens | ........................ | 33/497 |
| 2,735,185 A * 2/1956 | Naphtal | ........................ | 33/497 |
| 2,972,191 A * 2/1961 | Kichita | ........................ | 33/469 |
| 4,920,658 A * 5/1990 | Hile | ........................ | 33/499 |
| 5,117,560 A * 6/1992 | Nevins | ........................ | 33/471 |
| 5,392,525 A * 2/1995 | Chow | ........................ | 33/465 |
| 5,687,628 A * 11/1997 | Liao | ........................ | 33/500 |
| 6,237,238 B1 * 5/2001 | Shapiro | ........................ | 33/471 |

* cited by examiner

Primary Examiner—G. Bradley Bennett
(74) Attorney, Agent, or Firm—Herman Hohauser

(57) ABSTRACT

An angle measuring tool having pivotally connected members and an angle measurement index with and off center portion positioned so that upon the rotation of one member with respect to the other the angle between the two members can be accurately determined with no possibility of slippage of the angle measurement index due to the off center portion mating with one of the members.

8 Claims, 4 Drawing Sheets

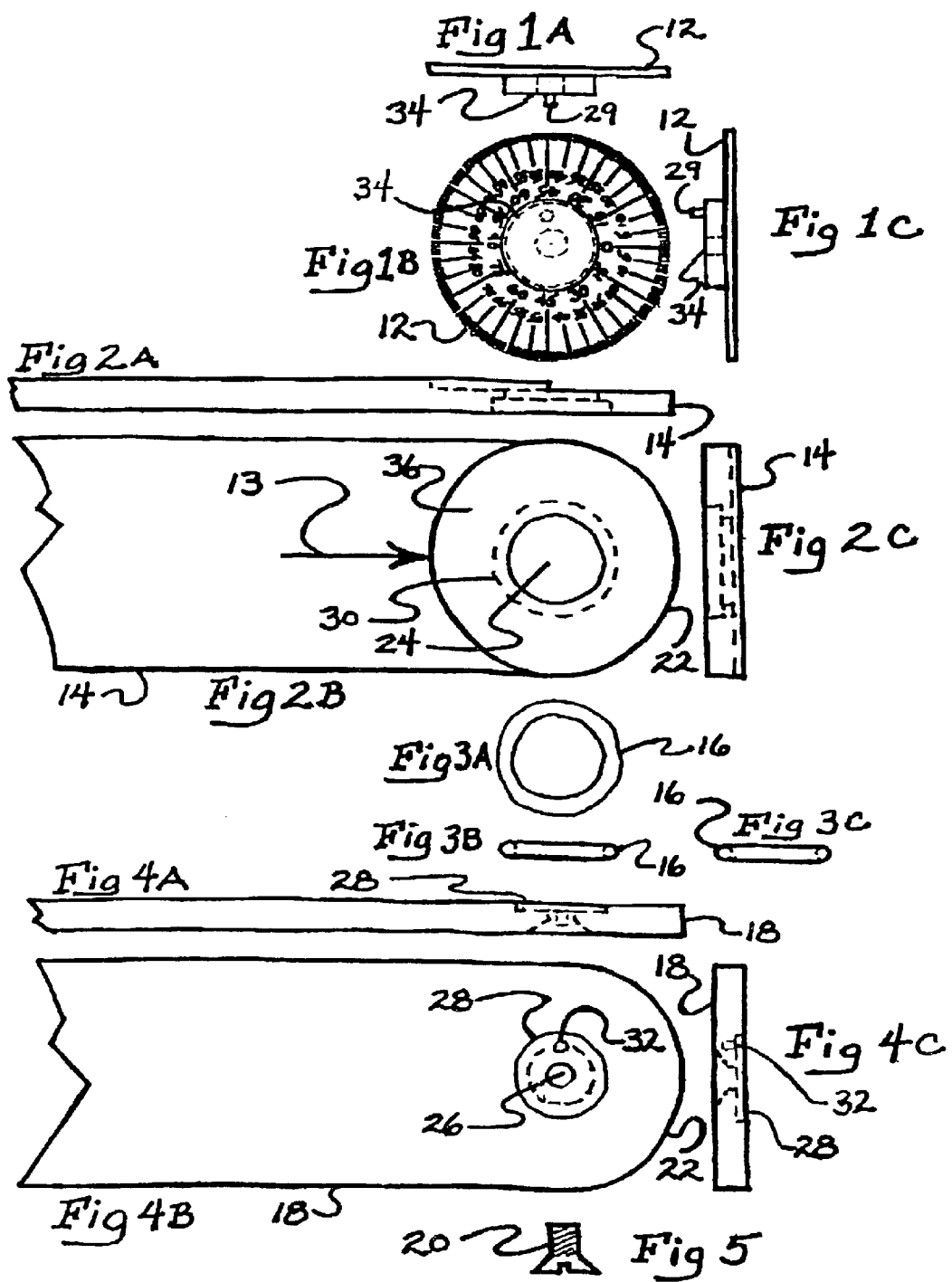

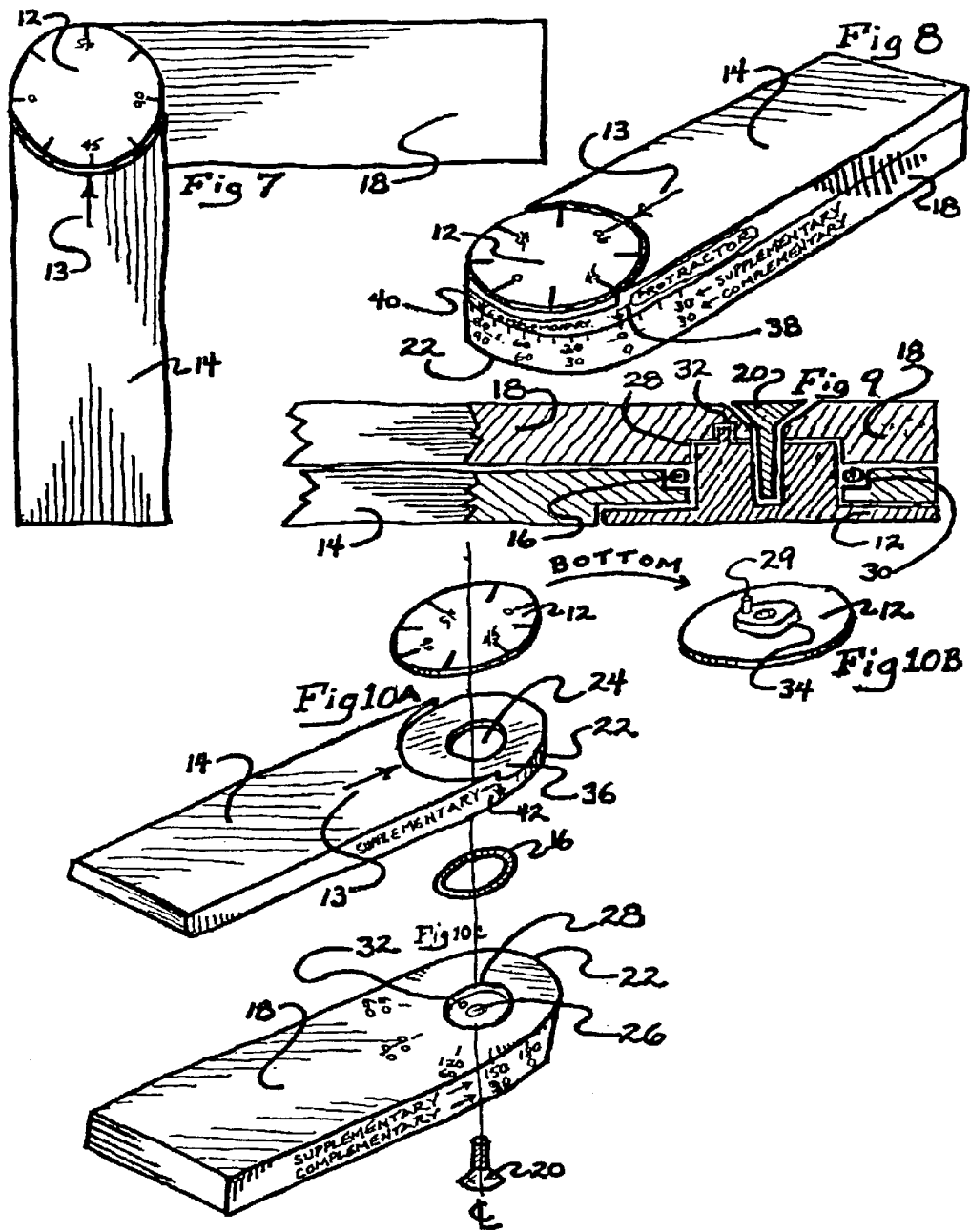

ANGLE MEASUREMENT TOOL

CROSS REFERENCE AND CLAIM OF PRIORITY

This application is related to Provisional Application No. 60/360,523, filed Feb. 28, 2002 and U.S. Pat. No. 6,237,238 B1, issued to Applicant on May 29, 2001. The benefit under 35 U.S.C. 119 (e) is hereby claimed for Provisional Application No. 60/360,523.

BACKGROUND OF THE INVENTION

This invention has to do with a measuring tool for use in the construction profession with particular applicability to finish carpentry, piping layouts, floor and ceiling installations and cabinetry. It also has direct applications in the graphic arts field, the engineering and drafting fields and other manufacturing situations where angle measurements are performed.

This invention is used in the fitting of trim and decorative pieces to the surface of wall surfaces which meet at an angular junction commonly referred to as a miter joint. A miter saw/miter box is used to cut the trim and decorative pieces in a precise manner so that a clean and accurate miter joint is established.

Without an adequate tool the craftsman must eyeball the setting of the miter saw.

BRIEF SUMMARY OF THE INVENTION

It is an object of this invention to provide an easy to use tool to transfer angle readings from a work place surface to a miter saw in a one-step operation.

It is a further object of this invention to measure an angle, its complementary angle and its supplementary angle simultaneously.

In the preferred embodiment of the invention an angle measurement tool is provided that in its final form is limited to two parts. At least one of the parts has a plurality of scale measurements scribed upon it. The tool is so constructed that the movement of the two parts relative to each other will result in an angle being formed there between that will be measured by referring to a setting on the scale so provided.

The tool can be utilized to measure the miter joint angle, the actual angle made by the legs of the tool, the complementary angle of the actual angle and the supplementary angle of the actual angle simultaneously.

BRIEF DESCRIPTION OF THE DRAWINGS

FIGS. 1A, 1B, and 1C are plan views of the dial 12.

FIGS. 2A, 2B, and 2C are plan views of top leg 14.

FIGS. 3A, 3B, and 3C are plan views of the O-ring 16

FIGS. 4A, 4B, and 4C are plan views of bottom leg 18.

FIG. 5 is a plan view of bolt 20.

FIG. 7 is a top view of the tool.

FIG. 8 is a perspective view of the tool in a closed position.

FIG. 9 is a side cut-away view of the tool.

FIGS. 10A, 10B, and 10C are exploded views of the tool.

DETAILED DESCRIPTION OF THE INVENTION

Figure 6:
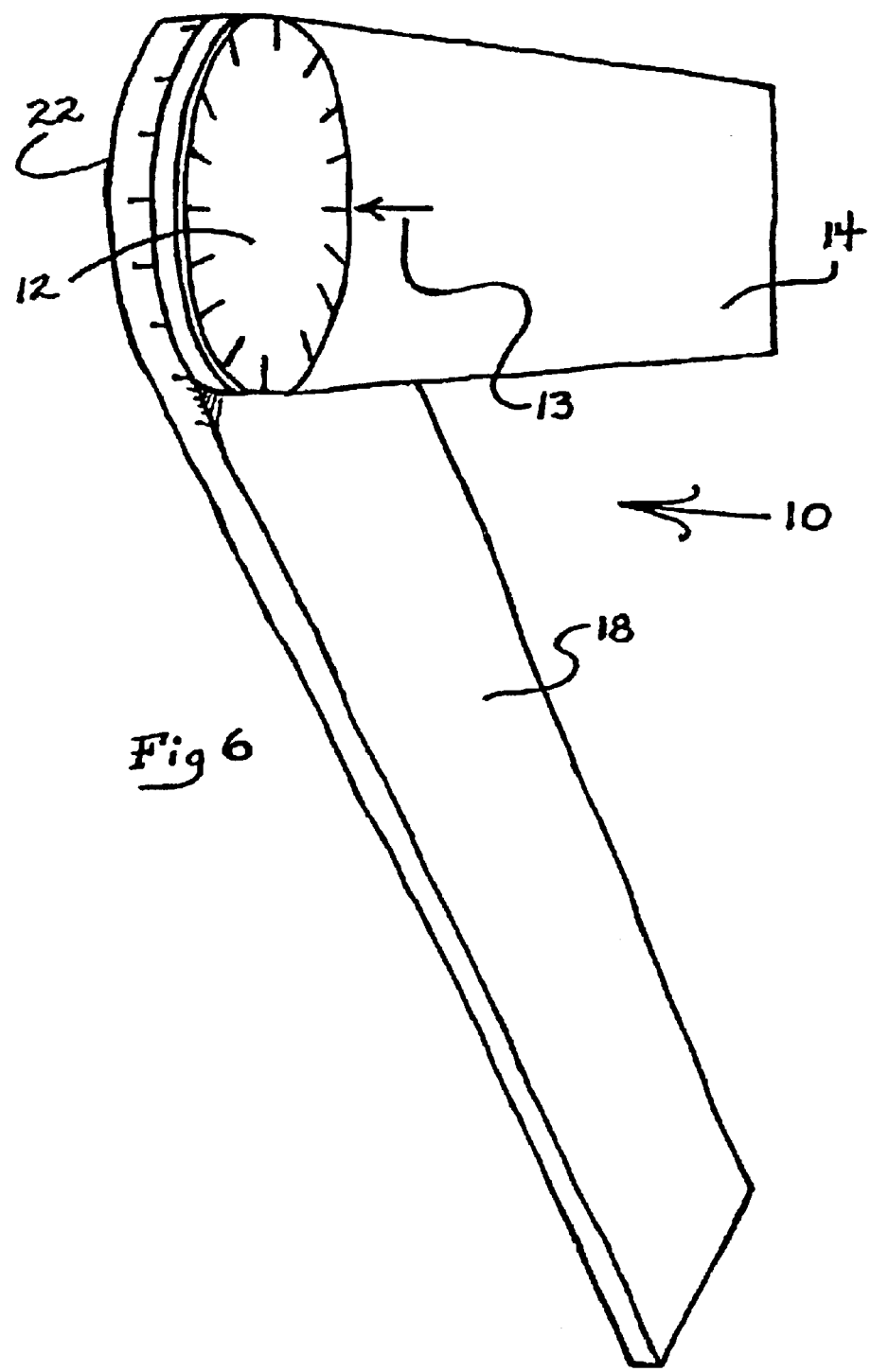
FIG. 6 is a perspective view of all of the components as assembled with the legs forming an acute angle.

As can be seen in Figures the preferred embodiment of angle measurement tool 10 is constructed from several components including dial 12, top leg 14, O ring 16, bottom leg 18 and bolt 20 Legs 14 and 18 are the same width and both have a circular shaped end 22. It should be understood that circular end 22 of both leg 14 and leg 18 is a semicircle of a circle having a diameter equal to the width of leg 14 and leg 18. Openings 24 and 26 in legs 14 and 18 respectively, are provided at the center of the circle of which ends 22 are a part. Dial 12 is circular in shape and has a diameter equal to the width of legs 14 and 18 as shown in the drawings. It should be understood that dial 12 could have a diameter less than the width of legs 14 and 18 in order to facilitate placing indicia on that surface and further, does not have to be in the shape of a circle in order for tool 10 to operate in the fashion described. Sockets 28 and 32 are recessed in to leg 18 around the perimeter of hole 26 as shown. The bottom surface of socket 28 has an off-center socket 32 for reasons that will be apparent below. In an alternative embodiment socket 32 can be on-center and in that case should have a non-circular shape.

When the components of tool 10 are assembled O-ring 16 is placed within the outer circumference of the recessed opening 30. Leg 14 is positioned over leg 18 so that the recessed opening 30 and O-ring 16 in leg 14 are concentric with opening 26 and socket 28 in leg 18.

Bolt 20 is then used to tighten and compress O-ring 16 between leg 14 and leg 18. The presence of O-ring 16 provides a frictional force between legs 14 and 18 that maintains dial 12 in a steady position for an accurate reading of the measured angle. It should be understood that O-ring 16 may not be necessary in all applications. Other position adjustment mechanisms are contemplated in alternative embodiments of the invention.

Leg 18 is provided with a positionally unique indexing socket 32 formed off the center of socket 28. In the preferred embodiment a circular projection 34 and off-center round peg 29 having the same shape as indexing socket 32 and socket 28 are provided on the bottom surface of dial 12 as shown in the drawing. When the components are assembled projection 34 and off-cente peg 29 fits snugly in socket 28 and socket 32 so that dial 12 and leg 18 never move in relation to each other.

Leg 14 is also provided with a flat recess 36 on the top surface thereof which results in the top surface of dial 12 being coplanar with the top surface of leg 14 after the components of tool 10 are assembled. It should be understood that the top surface of dial 12 does not have to be co-planer with the top surface of leg 14. Countersunk flathead bolt 20 is passed through the bottom of leg 18 into locking threads in the center of extension 34 on the bottom of dial 12 resulting in legs 14 and 18 compressing O-ring 16 in a sandwich-like manner. This provides precisely pivoting legs 14 and 18 with a friction adjustment. In the use of tool 10 no further friction adjustment is necessary. It is recognized that leg 14 is the only moving part of the tool 10 when being used to measure an angle for a miter joint reading.

Figure 11:
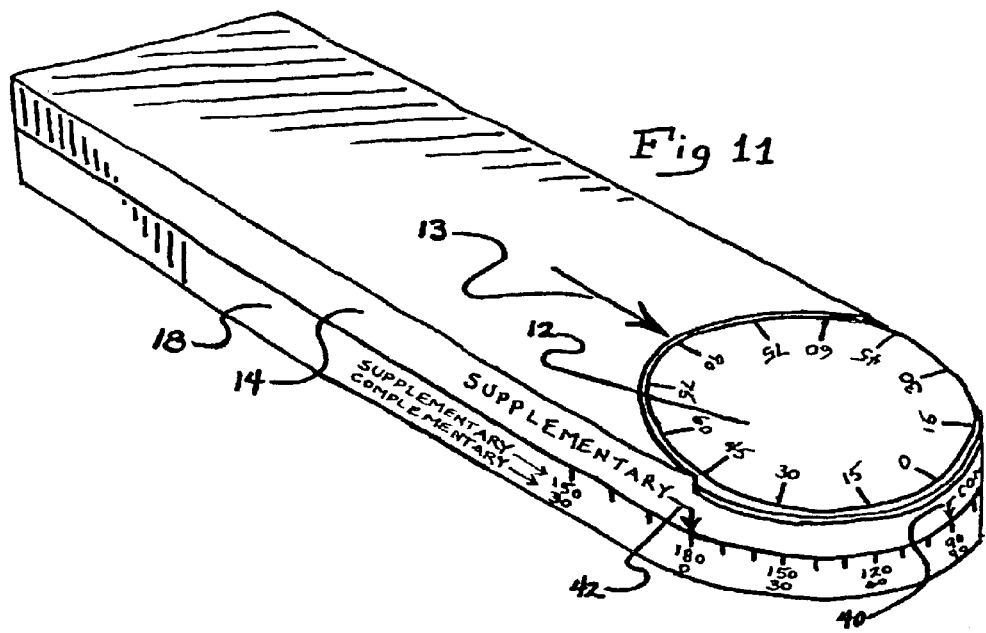
FIG. 11 is a perspective view of the tool in a closed position.
Figure 12:
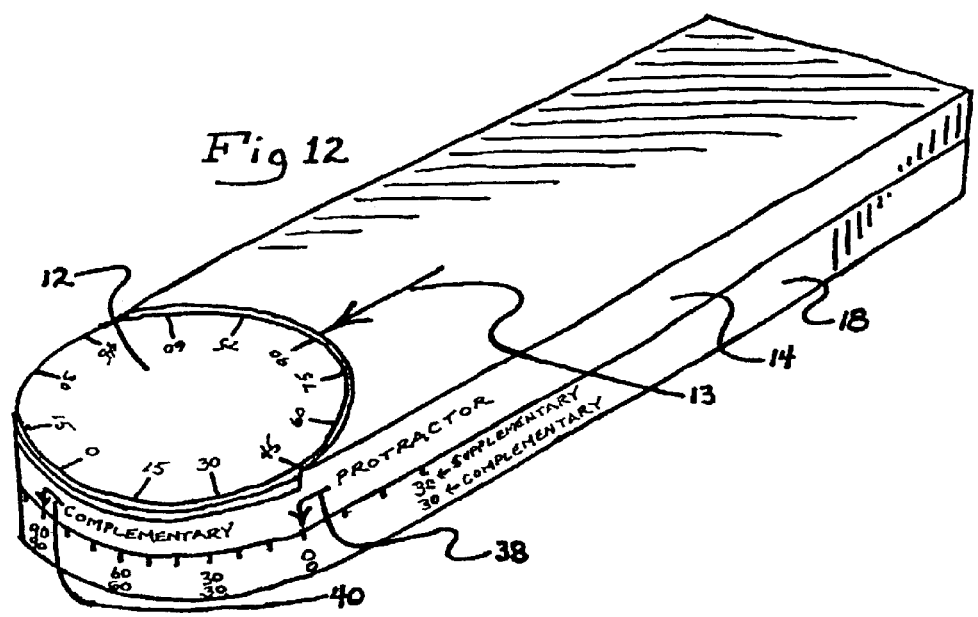
FIG. 12 is a perspective view of the tool in a closed position.

Arrow 13 is provided on the ton surface of leg 14 as shown in the figures. Arrows 38, 40 and 42 are provided on the radial surface of leg 14 as shown in FIGS. 11 and 12.

In operation tool 10 simultaneously provides the miter joint angle measurement, the actual angle made by the legs 14 and 18, the complementary angle measurement of the actual angle and the supplementary angle measurement of the actual angle. In the preferred embodiment dial 12 is provided with indexing markings that are representative of the miter joint angle reading. Specifically arrow 13 points to the marking on dial 12 that is the miter joint reading. The indexing provided on the radial surface of leg 18 measures the actual angle reading via arrow 38; the complementary angle reading via arrow 40 and the supplementary angle reading via arrow 42. Referring to FIGS. 11 and 12 it is noted that the indexing markings representing the complementary angles readings are located on the bottom row of numbers printed on the radial surface of leg 18 and the supplementary angle readings are located on the top row of numbers.

Although specific embodiments of the invention have been described it should be recognized that additional modification and other alternative embodiments may be apparent by those skilled in the art.

What is claimed is:

1. An angle measuring tool comprising:

a first leg having a recessed portion being pivotally connected to a second leg having a recessed portion, angle measurement means having a top side and a bottom side said angle measurement means positioned in said recessed portion of said first leg so that the surface of said top side is co-planar with the top surface of said first leg and a portion of said bottom side extends through an opening in said recessed portion of said first leg, said portion of said bottom side having a projection, said projection of said portion of said bottom side having an off-center peg extending from said projection wherein said portion fits into said recessed portion of said second leg and locking said second leg for movement together in relation to said second leg and wherein the angle formed by said first and second legs is readable on any surface of said first or second legs (said surface of said top side) of said angle measurement means.

2. The angle measurement means of claim 1 wherein said recess of said second leg has an off-center socket into which said peg is positioned.

3. The angle measurement means of claim 2 wherein an O-ring is positioned between said first and second legs to provide a frictional force between said first and second legs.

4. The angle measurement means of claim 3 wherein said first and second legs each have at least one straight edge.

5. The angle measurement means of claim 2 wherein said first and second legs each have at least one straight edge.

6. The angle measurement means of claim 4 wherein said first and second legs are held together by a bolt connected to said legs at said pivot point.

7. The angle measurement tool of claim 3 wherein said top surface of said top side of said angle measurement means is circular in shape.

8. The angle measurement tool of claim 7 wherein all of the actual angle, the miter joint angle and the complementary angle and the supplementary angle can be read simultaneously.

* * * * *